United States Patent [19]

Nix et al.

[11] 3,747,754

[45] July 24, 1973

[54] CARROUSEL-MOUNTED MICROFICHE MAGAZINE

[75] Inventors: William O. Nix, Newport Beach; Timothy P. Fitzgerald, Los Angeles, both of Calif.

[73] Assignee: Image Systems Inc., Culver City, Calif.

[22] Filed: Nov. 10, 1971

[21] Appl. No.: 197,235

Related U.S. Application Data

[63] Continuation of Ser. No. 056,537, July 20, 1970, abandoned.

[52] U.S. Cl............... 209/80.5, 220/23.4, 312/59, 312/197
[51] Int. Cl.............................................. B07c 5/34
[58] Field of Search................ 209/72, 80.5, 110.5; 229/22; 220/23.4; 312/183, 185–187, 111, 197, 59; 353/25, 27, 113, 116, 117

[56] References Cited
UNITED STATES PATENTS

| 3,283,761 | 11/1966 | Clover | 209/110.5 |
|---|---|---|---|
| 3,425,566 | 2/1969 | Maziarka | 312/59 X |
| 3,514,769 | 5/1970 | Woods | 209/80.5 X |
| 3,630,354 | 12/1971 | O'Brien | 209/80.5 |

Primary Examiner—Richard A. Schacher
Attorney—Fulwider, Patton, Rieber, Lee & Utecht

[57] ABSTRACT

A magazine for a plurality of microfiche adapted to be selectively associated with and to become a part of a carrousel holding a plurality of microfiche which are individually code identified for random access storage and retrieval of the microfiche from the magazine and carrousel. The magazine is substantially segment-shaped and comprises a carrousel supported and microfiche supporting body portion and a cover therefor which is removed to provide access to the microfiche therein. The body portion has means at the narrow end of the segment which interlocks with the carrousel to mount the magazine thereon.

16 Claims, 5 Drawing Figures

Patented July 24, 1973  3,747,754

INVENTORS
WILLIAM O. NIX
BY TIMOTHY P. FITZGERALD
Fulwider, Patton, Rieber
Lee, and Utecht
ATTORNEYS Patented July 24, 1973

INVENTORS
WILLIAM O. NIX
TIMOTHY P. FITZGERALD
BY Fulwider, Patton, Rieber
Lee, and Utecht
ATTORNEYS

CARROUSEL-MOUNTED MICROFICHE MAGAZINE

This is a continuation of application Ser. No. 056,537, filed July 20, 1970, and now abandoned.

BACKGROUND OF THE INVENTION

1. This invention relates to the field of storage and retrieval of microfiche mounted in carrousels.

2. The mounting of a plurality of microfiche in a drum-like carrousel rotating on a vertical axis and in which the microfiche are supported in a single large compartment or in a plurality of individual compartments circumferentially located around the drum is well known in the art, an example being shown in the patent to Eugene H. Irasek, U.S. Pat. No. 3,429,436. The magazines of that patent interlock with the carrousel but are not adapted for individual enclosure and storage exterior to the rotating drum or carrousel. The magazzine of the present invention has a cover directly associated therewith to enclose the microfiche for support and exterior storage in the closed magazine which, when mounted in the carrousel, has its cover removed to expose the microfiche to access and retrieval. The magazine has a more secure interlocking with the carrousel and only a limited arcuate portion of the carrousel receives the magazines for selective placement and replacement of the microfiche therein.

SUMMARY OF THE INVENTION

The rotating drum or carrousel in which the microfiche are located in radial planes within radially extending compartments provides access to the microfiche at their forward edges for selection and retrieval. An angular portion of the carrousel corresponding to the angular widths of several of the magazines is provided with means interlocking with the magazines to mount them in the angular carrousel portion for ready placement and replacement and ready incorporation of the microfiche in the magazines in the total storage capacity of the carrousel. The magazines are substantially segmentially shaped and comprise body portions open at the front and partially at the top, and having side walls converging towards the back where they terminate as an integral, generally flat wall having interlocking means such as a female dovetail part at the upper portion of the back. The top wall of the body portion has an integral slotted lug extending upwardly therefrom to be engaged by a locking cam on the cover.

The cover has short side walls complementary to the inclined side walls of the body portion, an open bottom and top wall which cooperate with the top wall on the body portion to enclose the magazine thereat. A cam is pivotally mounted on the top wall of the cover for rotation about a vertical axis and includes a notched flange entering the slot in the lug on the top of the body portion whereby the cover is locked to the body portion. The cam has a generally U-shaped handle integral with and extending upwardly therefrom and providing means for lifting and manipulating the closed magazine as it is transferred between the carrousel and a storage point.

The carrousel is provided with a flat bottom surface against which the bottoms of the body portions of the magazines rest, and with angularly disposed male dovetail parts adapted to cooperate with the female dovetail parts on the body portions of the magazines to locate the magazines securely in interlocked positions on the carrousel.

Preferably, the mounting of a magazine in the carrousel is effected with the cover of the magazine locked to its body portion so that the microfiche are held within the magazine against involuntary movement therefrom as might occur were the cover removed prior to mounting the body portion of the magazine and the microfiche in the carrousel. After the cover magazine is secured in the carrousel, the cam is turned to unlock the cover, and it may then be removed to expose the forward edges of the microfiche for access and retrieval.

The main body of the carrousel where the permanent compartments are located serves for the storage of microfiche which are to be relatively permanently associated with the carrousel, and the magazines may support additional microfiche which are to be associated with the carrousel relatively temporarily or for short periods. Any carrousel-mounted magazine body portion and microfiche can be readily replaced with other magazines and microfiche therein, with the body portion and cover securely holding the microfiche in the magazine during movement between the carrousel and a storage point, and securing the microfiche within the magazine at the storage point against loss or damage thereto.

The magazine arrangement further permits classification of related microfiche in a group for ready placement and replacement in the carrousel, and for safe storage of the microfiche outside the carrousel against loss or damage. The magazines may be stored on shelves or on rotatable racks and may be locked in a vault or fireproof cabinet.

The magazines may be made of any desired material, a satisfactory one being a moldable plastic such as high inpact strength styrene, or the like. With the use of interchangeable magazines, unlimited external storage is provided by the microfiche therein since there is no limit to the number of magazines which can be externally stored.

DESCRIPTION OF THE PREFERRED EMBODIMENT

Figure 1:
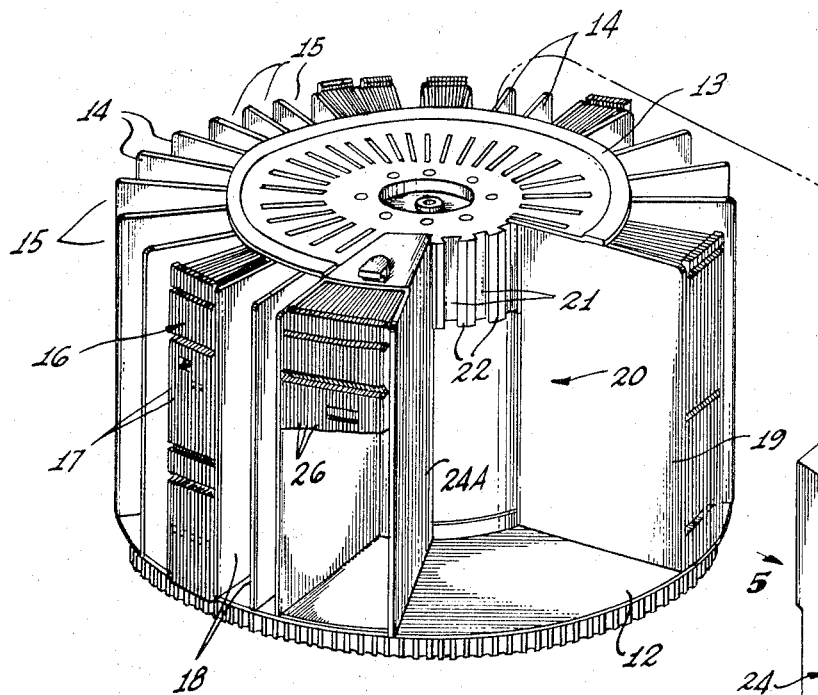
FIG. 1 is a perspective view of a carrousel having a magazine body portion positioned therein and a closed magazine about to be mounted therein.
Figure 2:
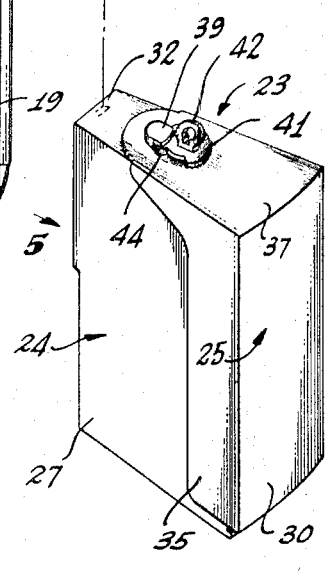
FIG. 2 is a partial plan view of the carrousel with a pair of magazines therein, one of which has its cover removed.
Figure 2:
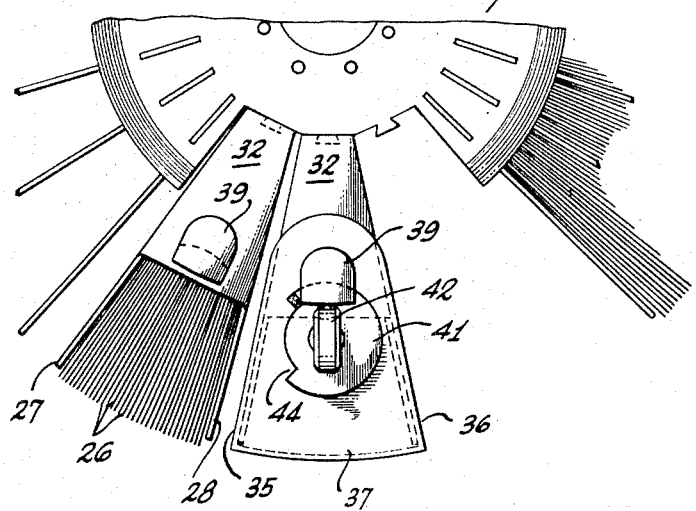
Figure 5:
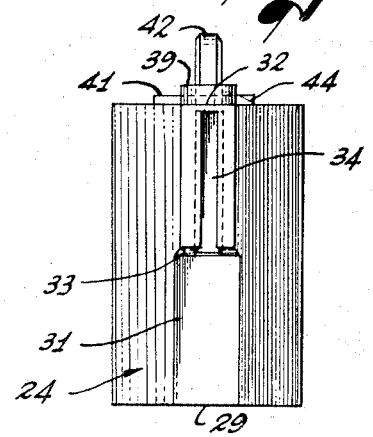
FIG. 5 is a back elevational view of the magazine in the direction of the arrow 5 in FIG. 1.
Figure 4:
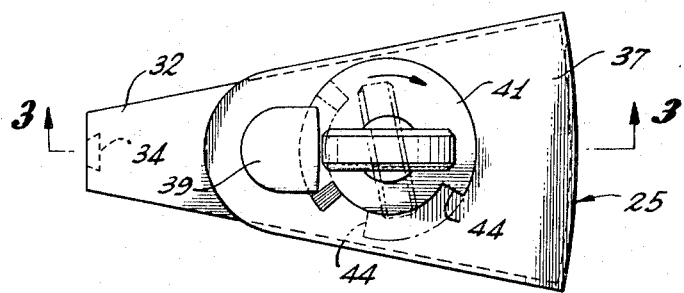
FIG. 4 is a top plan view of an individual magazine.

The rotating drum or carrousel 11 of FIG. 1 rotates about a vertical axis and may be utilized in the type of random access storage and retrieval device shown and described in the aforesaid Irasek U.S. Pat. No. 3,429,436. This carrousel has a flat supporting bottom 12 and a smaller top disc 13 between which are mounted radially extending walls 14 dividing the main portion of the carrousel into a plurality of individual radially-extending compartments 15. In each of the compartments 15 are relatively permanently stored a plurality of microfiche 16, each having a plurality of micro-images thereon and having magnetic front edges 17 which are notched in an identity code so that each microfiche will be identified by the location of the coding notches therein in accordance with any desired system.

The carrousel 11 is provided with a relatively large angular compartment 20 between radially extending walls 18 and 19, and it is within this angular compartment that the removable and replaceable magazines may be located. Adjacent the top of the angular compartment 20 is mounted an arcuate supporting member 21 rigid with the bottom plate 12 and top disc 13 to rotate therewith and with the carrousel. The arcuate supporting member 21 has male dovetail parts 22 facing forwardly thereof which cooperate with rearward facing female dovetail parts in the upper portion of the back walls of the magazines.

Each magazine 23 comprises a body portion 24 supporting microfiche 26 therein and a cover 25 which cooperates with the body portion 24 to enclose the microfiche 26 so that they may be transported and stored without danger of loss or damage. The body portion 24 has a pair of angularly disposed side walls 27 and 28 interconnected by a bottom wall 29, a narrow back wall 31 and a partial top wall 32. The body portion 24 is shown as having a generally segmental shape with side walls 27 and 28 converging towards the back where they are joined by the narrow back wall 31. Integral with the wall 31 is a thickened upper portion 32 which has a female dovetail part 34 therein adapted to secure one of the male dovetail parts 22 of the arcuate support 21 on the carrousel.

The cover 25 has a pair of short side walls 35 and 36 interconnected by a front wall 30 and a rearwardly extending top wall 37 but having an open bottom at 38. The side walls 35 and 36 are angularly disposed to complement the side walls 27 and 28 of the body portion 24 so that the cover 25 slides onto the body portion 24 in a longitudinal direction, from the top as viewed in the figures.

The top wall 32 of the body portion 24 has an integral lug 39 extending upwardly therefrom in which there is a horizontally disposed slot 40. In the top wall 37 of the cover 25 is an opening 50 through which the lug 39 on the body portion extends with its slot 40 positioned with its lower surface concident with the surface of the top wall of the cover. On the top wall of the cover in alignment with the opening 50 is rotatably mounted a notched, flat cam 41 by a pin 43. The cam 41 has an upwardly extending, generally U-shaped, integral handle 42 by which the cam 41 may be rotated into and out of the slot 40 in the lug 39. The cam 41 has an arcuate notch 44 therein which clears the lug 39 on the body portion 24. Thus, when the cam 41 is turned so that the notch 44 is opposite the lug 39, the cover 25 may be readily removed longitudinally of the body portion 24 until the side walls 35 and 36 of the cover 25 leave the side walls 27 and 28 of the body portion 24, whereupon the cover is entirely separated therefrom, as is the case of the body portion 24A of FIG. 1 mounted in operating position in the carrousel 11.

If it is desired to insert a new magazine in the carrousel 11, a magazine which is no longer in use is removed, as will be hereinafter explained, and then a new magazine with its cover 25 locked to its body portion 24 and having the classification of microfiche which it is desired to retrieve stored therein, is taken from whatever storage location it may be in and brought to the carrousel 11, as indicated in FIG. 1. The cover 25 is preferably left locked to the body portion 24 while the body portion is being mounted in the carrousel 11, thus preventing involuntary movement of the microfiche out of the body portion of the magazine with attendant scattering and possible damage to the microfiche. The closed magazine 23 is moved into the large angular opening 20 of the carrousel by gripping the magazine 23 in any desired way, but preferably by the handle 42. The magazine 23 is then manipulated so that the bottom of the female dovetail part 34 in the back wall 31 of the body portion 24 receives the top of a male dovetail part 22 on the arcuate support 21 in the carrousel and the magazine is then moved vertically downwardly until its bottom wall 29 engages the bottom wall 12 of the carrousel. The new magazine is thereby firmly mounted in position within the angular chamber 20 and the cover 25 is now removed by rotating the cam 41 by the handle 42 until the notch 44 is opposite the lug 39, whereupon the cover may be vertically raised from the body portion 24 and placed in a storage position. With removal of the cover 25, the microfiche 26 in the body portion 24 are accessible for retrieval, as in the body portion 24A of FIG. 1, in the same relative position in the rotatable carrousel 11 as are the relatively permanent microfiche 17 in the compartments 15.

Figure 3:
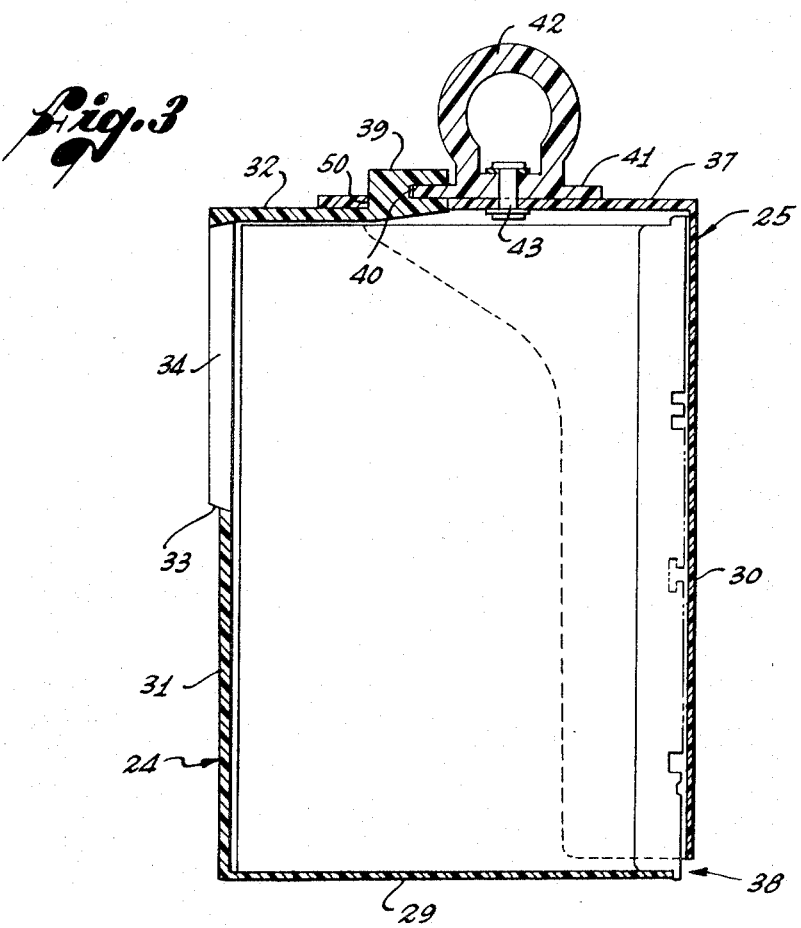
FIG. 3 is a radial sectional view through a magazine.

To remove a magazine body portion 24 from the carrousel, for example the body portion 24A of FIG. 1, its cover 25 is preferably first mounted thereon to prevent possible slipping of the microfiche from the body portion with attendant scattering or damage thereto. A cover 25 is moved vertically downwardly onto the body portion 24 so that the cover legs 35 and 36 receive therein forward edges of the legs 27 and 28 of the body portion 24. The cover is preferably so mounted with the cam 41 rotated to place the notch 44 opposite the opening 50. When the cover is fully down in the position of FIG. 3, the cam 41 is rotated by the handle 42 so that it enters the slot 40 in the lug 39 and securely locks the cover 25 on the body portion 24. The magazine 23 may then be lifted vertically by the handle 42 until the male dovetail part 22 in the carrousel leaves the female dovetail part 34 on the magazine, whereupon the magazine may be bodily removed from the carrousel and placed in its storage location.

The number of microfiche 17 which may be relatively permanently stored in the carrousel 11 is, of course, limited by the space provided in the compartments 15. However, the total storage capacity of the magazines 23 is substantially unlimited, since any number of them may be externally stored. Therefore, with the present invention, the capacity of the carrousel 11 is amplified to an unlimited extent by having the replaceable magazines 23 mountable therein. In ordinary operation, the microfiche 17 in the compartments 15 will be those which are most in use and are relatively permanently located within the carrousel. Likewise, the microfiche 26 within the magazines 23 are those which are used only at intervals so that they can be conveniently removed from the carrousel and stored external thereto, whereby not to occupy space in and limit the capacity of the carrousel for regularly used microfiche. The magazine of this invention securely holds the microfiche enclosed against damage while stored and also while being transported between storage and the carrousel, and the mounting of the microfiche supporting body portion of the magazine in the carrousel with its cover in place securely holds the microfiche within the magazine against possible scattering and damage. When located in the carrousel, the cover 25 may be readily removed from the body portion 24, leaving the microfiche 26 in position for access and retrieval in the same manner as the microfiche 17 in the permanent compartments 15.

While the carrousel 11 has been illustrated and described as mounting a plurality of magazines 23 in a large angular compartment 20, it will be understood that a plurality of compartments may be spaced around the carrousel, at, for example, 120° apart, and each compartment may hold one or more magazines. It is also contemplated within the invention that the entire carrousel may be made up of removable magazines without any permanent compartments 15.

While a certain preferred embodiment of the invention has been specifically illustrated and described herein, it will be understood that the invention is not limited thereto, as many variations will be apparent to those skilled in the art, and the invention is to be given its broadest interpretation within the terms of the following claims.

We claim:

1. A magazine for microfiche comprising:
   a substantially segment-shaped body portion having angularly disposed side walls interconnected by a bottom wall, a relatively narrow back wall, and at least a partial top wall, said walls being dimensioned to provide a chamber for a plurality of microfiche;
   means on said body portion for mounting it in a carrousel for access and retrieval of the microfiche therein from the front;
   a cover for said body portion providing at least a partial top wall and a front wall cooperating with the body portion walls to enclose the microfiche therein; and
   means for releasably holding said cover on said body portion.

2. The magazine defined in claim 1 in which said means for mounting the body portion in the carrousel is located on the back wall thereof so as not to interfere with like magazines mounted therebeside in the carrousel.

3. The magazine defined in claim 1 including:
   partial side walls on said cover angularly disposed complementary to the angular disposition of the side walls of the body portion and spaced so as to closely fit over the body portion side walls.

4. The magazine defined in claim 1 in which said holding means comprises:
   a lug projecting upwardly from the top wall on said body portion;
   an opening in the top wall of said cover receiving said lug; and
   means on the cover top wall interlocking with said lug to hold the cover in place on the body portion.

5. The magazine defined in claim 4 in which said cover interlocking means comprises:
   a rotatable cam plate mounted on the top wall of the cover and having a notch therein clearing said lug; and
   means rotatably mounting said cam plate so that it can be projected into a slot located transversely in the lug, thereby locking the cover to the body portion.

6. The magazine defined in claim 5 in which:
   said cover has an open bottom and partial side walls angularly disposed to embrace the side walls of the body portion so as to be assembled thereon by longitudinal relative movement between the cover and the body portion, adjacent the termination of which said lug projects through the opening in the top wall of the cover and is positioned for engagement of the cam plate in the slot in the lug upon rotation of the cam plate.

7. The magazine defined in claim 5, including:
   a handle mounted on said cam plate for rotating it and also providing means for holding the magazine.

8. A carrousel comprising:
   an annular body;
   means for relatively permanently storing a plurality of microfiche in said body in substantially vertical and radial positions;
   a relatively large angular compartment in said body; and
   means in said relatively large compartment for replaceably mounting a plurality of body portions of the magazine defined in claim 1 therein, whereby, with covers removed, the body portions mount microfiche for access and retrieval from their forward edges in the same manner as for the relatively permanent microfiche stored in the body of the carrousel.

9. The carrousel defined in claim 8 including:
   a plurality of permanent compartments in said carrousel body angularly spaced therearound and providing for the storing of said plurality of microfiche therein.

10. The carrousel defined in claim 8 in which the mounting means for the magazine body portion comprises:
    a dovetail part on the back wall thereof; and
    a complementary dovetail part in the carrousel interlocking therewith to mount the body portion and the microfiche therein in the carrousel.

11. In a magazine for holding a plurality of microfiche for insertion in and removal from a microfiche retrieval machine, the combination comprising,
    interconnected wall portions, said portions dimensioned to provide a container for holding a plurality of microfiche,
    means for mounting said container in said microfiche retrieval machine,
    removable cover means for said container, and,
    means for releasably attaching said cover means to said container for permitting said container to be lifted by the attached cover means for insertion in and removal from the microfiche retrieval device.

12. The combination of claim 11, wherein said interconnected wall portions comprise side wall portions interconnected by a bottom wall portion and a back wall portion.

13. The combination of claim 12, wherein said mounting means is on said back wall portion.

14. In a magazine for holding a plurality of microfiche for insertion in and removal from a microfiche retrieval machine, the combination comprising,
    interconnected wall portions, said portions dimensioned to provide a container for holding a plurality of microfiche, means for mounting said container in said microfiche retrieval machine,
a lug projecting upwardly from said container,
removable cover means for said container, said cover means having an opening for receiving said lug, and
means on said cover means for interlocking with said lug to hold the cover means on said container.

15. The combination of claim 14, wherein:
said interconnected wall portions comprise segment-shaped bottom and top wall portions interconnected by angularly disposed side wall portions and a back wall portion, and
said mounting means is on said back wall portion.

16. In a magazine for holding a plurality of microfiche for insertion in and removal from a microfiche retrieval machine, the combination comprising,
interconnected wall portions, said portions dimensioned to provide a container for holding a plurality of microfiche and including segment-shaped bottom and top wall portions interconnected by angularly disposed side wall portions and a back wall portion,
means for mounting said container in said microfiche retrieval machine,
removable cover means for said container, and
means for releasably attaching said cover means to said container.

* * * * *